(12) United States Patent
Eudeline et al.

(10) Patent No.: US 6,757,252 B1
(45) Date of Patent: Jun. 29, 2004

(54) PROCESS OF TEMPORAL MANAGEMENT OF A MULTIPLEXED BUS

(75) Inventors: Patrice Eudeline, Montigny le Bretonneux (FR); Franck Gansmandel, Paris (FR); Patrice Toillon, Le Pecq (FR)

(73) Assignee: Sextant Avionique, Velizy Villacoublay (FR)

( * ) Notice: Subject to any disclaimer, the term of this patent is extended or adjusted under 35 U.S.C. 154(b) by 1243 days.

(21) Appl. No.: 08/913,523

(22) PCT Filed: Jan. 14, 1997

(86) PCT No.: PCT/FR97/00060

§ 371 (c)(1),
(2), (4) Date: Sep. 19, 1997

(87) PCT Pub. No.: WO97/26738

PCT Pub. Date: Jul. 24, 1997

(30) Foreign Application Priority Data

Jan. 19, 1996 (FR) .............................. 96 00605

(51) Int. Cl.[7] .............................. H04J 3/14; H04J 3/12
(52) U.S. Cl. ...................................... 370/241; 370/528
(58) Field of Search ............................... 370/241, 244, 370/245, 458, 535, 537, 419, 620, 521–528; 701/14.1

(56) References Cited

U.S. PATENT DOCUMENTS

| | | | | |
|---|---|---|---|---|
| 3,636,524 A | * | 1/1972 | Holland | 370/528 |
| 4,833,673 A | * | 5/1989 | Chao et al. | 370/535 |
| 4,962,497 A | * | 10/1990 | Ferenc et al. | 370/458 |
| 5,019,980 A | * | 5/1991 | Starr et al. | 364/424.04 |
| 5,424,949 A | * | 6/1995 | Applegate | 701/14 |
| 5,864,687 A | * | 1/1999 | Baker et al. | 395/309 |

* cited by examiner

*Primary Examiner*—Steven H. D Nguyen
(74) *Attorney, Agent, or Firm*—Oblon, Spivak, McClelland, Maier & Neustadt, P.C.

(57) ABSTRACT

The management process of the invention is in particular intended for the temporal management of an ARINC 629 bus for avionics rigs, and it is characterized in that the rigs to which new information is not available or to which only inconsistent information is available are made to send substituted information (WS(2), WS(3)) furnished with characteristic identifications (S1, S2) at the send instants (TA) which are assigned thereto.

10 Claims, 2 Drawing Sheets

US 6,757,252 B1

PROCESS OF TEMPORAL MANAGEMENT OF A MULTIPLEXED BUS

BACKGROUND OF THE INVENTION

1. Field of the Invention

The present invention relates to a process of temporal management of a multiplexed bus.

2. Discussion of the Background

In current aircraft, the various electro-mechanical and electronic facilities are linked to a bus on which the information sent by these rigs is time-division multiplexed and concatenated. The management of this bus currently meets the ARINC 629 standard. This standard stipulates, in particular, a time template for the send instants of the various rigs, in order, in particular, to avoid overlaps in information from different rigs.

To guarantee compliance with the send instants assigned to the various rigs, it is known to make them send information over the bus in systematic rotation. If, at the instant at which they are to send, new information is not available to these rigs, they resend old information, this needlessly overburdening the destination receivers.

SUMMARY OF THE INVENTION

The subject of the present invention is a process which makes it possible, in a system with several rigs linked to a time-division multiplexed bus, to manage the sendings of the rigs in an optimal and secure manner without needlessly overburdening the receivers.

The process according to the invention consists in making the rigs to which new information is not available, or to which only inconsistent information is available, send substituted information furnished with characteristic tags at the send instants assigned thereto.

BRIEF DESCRIPTION OF THE DRAWINGS

The present invention will be better understood on reading the detailed description of a mode of implementation taken by way of non-limiting example and illustrated by the appended drawing in which.

DISCUSSION OF THE PREFERRED EMBODIMENTS

The present invention is described below with reference to an avionics system with a standardized ARINC 629 bus, but it is of course not limited to this application, and may be implemented in time-division multiplexed bus systems in which new information is not available in each send cycle to at least some of the rigs attached to this bus.

Figure 1:
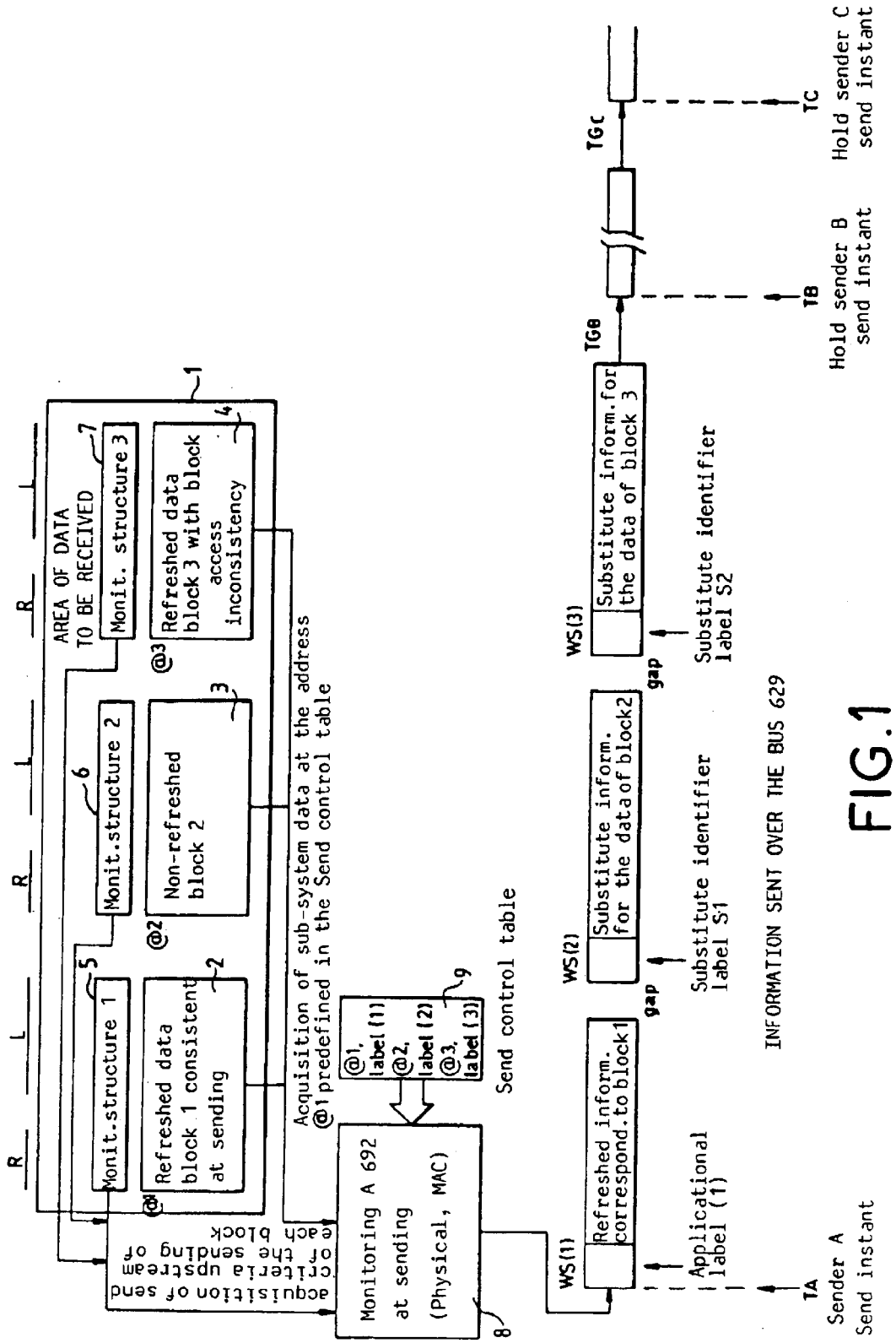
FIG. 1 is a diagram explaining the process of the invention in the send phase.
Figure 2:
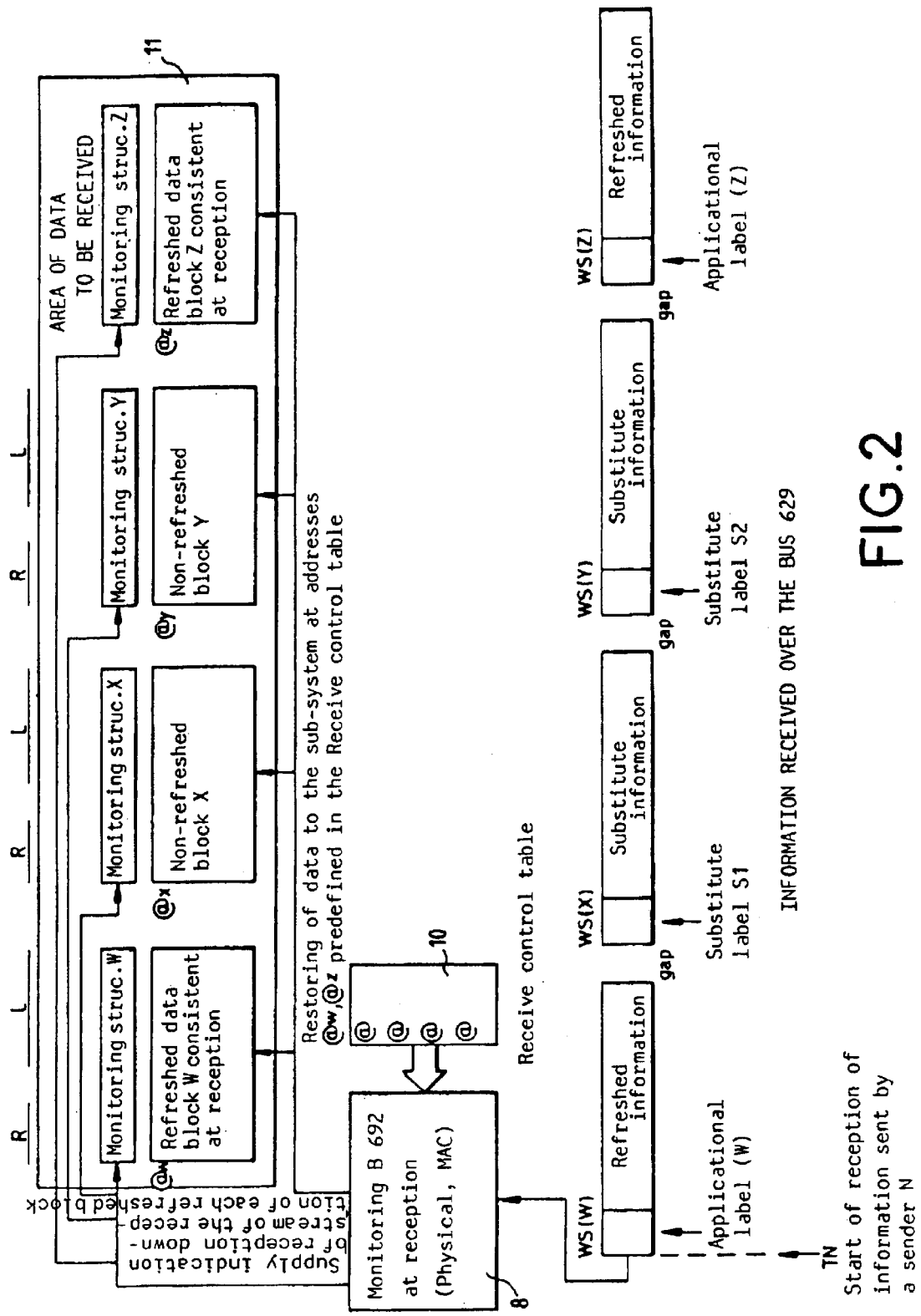
FIG. 2 is a diagram explaining the process of the invention in the receive phase.

The information sent by the rigs over the bus to which they are attached is grouped into wordstrings (or WS for short in FIGS. 1 and 2, at the rate of at least one wordstring per rig and per instance of sending. The length of a string can vary, without however exceeding a certain maximum value, predefined so as not to disturb the sequencing of the time-division multiplexing. With each string are associated essentially two blocks in the data area corresponding to each wordstring: a first block, termed the tag, containing the various data for identifying and managing the string, and a second, informational block containing the information proper forwarded by the sending rig corresponding to one or more receiving rigs.

According to the invention, the information blocks sent over the bus contain only refreshed and consistent information or else substituted information preceded by a content-specific identification ("Label"). Of course, the tag blocks include a field R indicating the nature of this information (refreshed or not). Given that these tag blocks are relatively short and can easily be processed upstream of the information processing circuits of the destination rigs, these processing circuits are not needlessly occupied in processing non-refreshed or inconsistent information.

The refreshed state of an informational block is defined here as the state of this block after its content is updated by the rig which generated it, before any sending over the bus. Once sent, this informational block is regarded as expended, since the destination rig(s) will have taken it into account (whether it be the original informational block or a substituted block because of a non-refreshing or an inconsistency of access).

The consistency of an informational block, or more precisely the consistency of the access to this block, is defined as the positive result of the monitoring of the actual locating of this block in the area of data to be sent with respect to this block's predefined address in the send control table of the monitoring unit attached to the sending rig. Apart from the aforesaid field R indicating whether the corresponding informational block contains refreshed or non-refreshed information, the tag block includes a field L making it possible to monitor the consistency of this informational block.

Each facility of the system co-operating with the ARINC 629 bus is linked to this bus via a monitoring unit and its environment containing, in a manner known per se, an exchange memory for sending/receiving and send and receive control tables making it possible to verify the consistency of the wordstrings sent. The facility together with its monitoring unit form a whole referred to as a rig. This monitoring unit, before the sending of each wordstring inter alia, monitors the refreshing of the information to be sent and its consistency (by consulting the control tables and the tag block). When this monitoring has been carried out, it instructs the sending over the multiplexed bus of the selected item of information (refreshed or substituted) together with the corresponding identification. At reception, the monitoring unit "filters" the incoming wordstrings by virtue of the identification received at the head of each wordstring. If this identification indicates that the informational block which it accompanies contains refreshed information, the latter is transmitted to the corresponding receiving facility. In the contrary case, the substituted information is not transmitted to this receiving facility. Consequently, the facility has only to process refreshed and integral information.

The implementation of the process of the invention will now be explained in detail with reference to FIGS. 1 and 2 (sending and receiving, respectively).

Represented in the diagram of FIG. 1, in arbitrary conventional manner, is an area 1 of data to be sent by any rig A. This area 1 includes, for example, three data blocks (information blocks) to be sent, referenced 2, 3 and 4 respectively. With each of these blocks is associated a monitoring structure, 5, 6 and 7 respectively (tag blocks). These monitoring structures are binary words which each contain data indicating whether the corresponding information of blocks 2 to 4 are refreshed or not, and explicitly identify the content of these information blocks, thus making it possible to verify their consistency of access in accordance with their content (label-address consistency mechanism). All the blocks 2 to 7 are processed by the monitoring unit 8 relating to the relevant facility.

In the send phase, when the system in which the facility is installed determines its instant of sending over the multiplexed bus, the monitoring unit 8 consults the send control table 9. This control table includes the various addresses @1, @2, @3 of the blocks 2 to 4 respectively. The current pointer of this table indicates out of these addresses the one of the block to be sent, and the unit 8 deduces from this the address of the monitoring structure associated with the information block situated at this address. The content of this monitoring structure supplies the unit 8 with the state of refresh of the selected block. This content essentially includes, as specified above, a field R and a field L.

In the simplified example of FIG. 1, the block 2 includes data which is refreshed and consistent as regards their content (in relation to the send control table 9). By contrast, block 3 has not been refreshed and block 4 has been refreshed, but its data are inconsistent with respect to what was programmed into the table 9. Consequently, the unit 8, which is to send an information block at the send instant TA assigned to it, sends a first string WS(1) containing the refreshed information of block 2, a second string WS(2) containing information substituted for that of block 3 and a third string WS(3) also containing substituted information which is chosen from a predefined list known to all the rigs plugged into the ARINC 629 bus. This list may include one or more specific items of substitute information, depending on the specifications of the relevant 629 system. The length of the substituted block is strictly equal to that of the original block (block 3 or 4 in the present example), so that from the temporal point of view no disturbance is caused in respect of the rigs linked to the bus regardless of the information which they send. The content of the substituted block may, for example, include, after the identification field, a set of mutually identical words, equal in value to the length of the original block. Moreover, because each rig "listens" to the bus, that is to say receives via the bus what has just been sent, it can monitor its sendings, and in particular it can monitor the content of the substituted blocks.

At reception (FIG. 2), it is assumed that a distant rig N sends, at a send instant TN, four wordstrings (WS (W) to WS(Z)) destined for the rig B, whose monitoring unit 8 is also represented in FIG. 2. It will be observed that the number of wordstrings sent by a given rig may differ from that of another rig, in particular because some rigs of an ARINC 629 system have little information to send, and others much more. The unit 8 is associated with a receive control table 10 in which are programmed the addresses of the data which it is liable to receive, namely, in the present case, @W, @X, @Y and @Z. Thus, when the data travel over the bus, the monitoring unit 8 consults the table 10 so as to filter them, i.e. so as to determine whether it is or is not their intended destination.

If it is assumed that the strings WS (W) and WS (Z) contain refreshed information signposted by their respective identifications (labels W and Z), and the strings WS (X) and WS (Y) contains substitute information signposted by their specific identifications (labels S1 and S2), the unit 8 discards the data of WS (X) and WS (Y) of the area 11 of the data to be received since they cannot be used by its rig, thereby unburdening the latter of the analysis of these data. By contrast, the data of WS (W) and WS (Z) are transmitted to the area 11 of data to be received so as subsequently to be processed at addresses @W and @Z determined by the table 10. For this purpose, the monitoring unit 8 uses the monitoring structure associated with each block of informational data (tag blocks). As specified above, this monitoring structure includes a field R with refreshed data, as the case may be, which are then processed by the corresponding rig, and a field L for explicit identification of the informational data block (consistency with the content via consistency-type monitoring of the content and the address) which makes it possible, on using the block, to validate the integrity of the block received and hence to process it later in the corresponding rig.

What is claimed is:

1. A process for temporally managing a multiplexed bus to which a plurality of rigs are linked, comprising the steps of:

time-multiplexing the bus so that each of the plurality of rigs is assigned a respective send instant to send information on the bus;

controlling said plurality of rigs so that if any of said plurality of rigs has no new information or inconsistent information to be sent on the bus, said any of said plurality of rigs sends substituted information with a characteristic identification, the characteristic information being separate from the substituted information and configured to indicate a presence of the substituted information, at the send instant respectively assigned thereto.

2. A process according to claim 1, wherein the information sent by the plurality of rigs is grouped into wordstrings, each wordstring including a block of refreshed or substituted informational data and an identification block.

3. A process according to claim 2, wherein the wordstrings containing substituted information have a same length as wordstrings for which they are substituted.

4. A process according to claim 1, wherein the plurality of rigs include monitoring units connected to the bus to receive the information from other of the plurality of rigs, and at reception the substituted information is discarded by the monitoring units without being processed.

5. A process according to claim 1, wherein the bus is the ARINC 629 type.

6. A process according to claim 2, wherein the plurality of rigs include monitoring units connected to the bus to receive the information from other of the plurality of rigs, and at reception the substituted information is discarded by the monitoring units without being processed.

7. A process according to claim 3, wherein the plurality of rigs include monitoring units connected to the bus to receive the information from other of the plurality of rigs, and at reception the substituted information is discarded by the monitoring units without being processed.

8. A process according to claim 2, wherein the bus is the ARINC 629 type.

9. A process according to claim 3, wherein the bus is the ARINC 629 type.

10. A process according to claim 4, wherein the bus is the ARINC 629 type.

* * * * *